United States Patent [19]
Uhlenhoff

[11] Patent Number: 4,958,313
[45] Date of Patent: Sep. 18, 1990

[54] CMOS PARALLEL-SERIAL MULTIPLICATION CIRCUIT AND MULTIPLYING AND ADDING STAGES THEREOF

[75] Inventor: Arnold Uhlenhoff, Emmendingen, Fed. Rep. of Germany

[73] Assignee: Deutsche ITT Industries GmbH, Freiburg, Fed. Rep. of Germany

[21] Appl. No.: 307,125

[22] Filed: Feb. 6, 1989

[30] Foreign Application Priority Data

Mar. 19, 1988 [EP] European Pat. Off. .......... 88104413

[51] Int. Cl.$^5$ .............................................. G06F 7/52
[52] U.S. Cl. .................................................... 364/757
[58] Field of Search ..................... 364/754, 757–760

[56] References Cited

U.S. PATENT DOCUMENTS

| | | | |
|---|---|---|---|
| 3,610,907 | 10/1971 | Taylor | 235/164 |
| 3,617,723 | 11/1971 | Melvin | 364/759 |
| 3,816,732 | 6/1974 | Jackson | 364/759 |
| 3,878,985 | 4/1975 | Ghest et al. | 235/164 |
| 4,013,879 | 3/1977 | Bornmann et al. | 364/757 |
| 4,041,297 | 8/1977 | Jesse | 364/758 |
| 4,142,242 | 2/1979 | Duvochel et al. | 364/759 |
| 4,734,597 | 3/1988 | Ullrich et al. | 307/481 |
| 4,763,297 | 8/1988 | Uhlenhoff | 364/900 |

OTHER PUBLICATIONS

1234 Nachrichten Elektronik, vol. 36 (1982), Feb., No. 2, Heidelberg, Deutschland, "Seriell/Parallel-Multiplizierer fur die digitale Signalverarbeitung", Tiel 1 by Volker Leesemann, pp: 75–78.

*Primary Examiner*—Dale M. Shaw
*Attorney, Agent, or Firm*—Thomas L. Peterson

[57] ABSTRACT

An integrated CMOS multiplication circuit is operated in a parallel-serial mode and executes binary multiplication of a multiplicand and multiplier within the period of a system clock signal by an improved implementation of the two's complement method. The multiplication circuit includes an input shift register for receiving the multiplicand bits in parallel and reading them out serially as clocked by an internal clock signal of higher frequency than the system clock signal, a single chain of multiplying stages each receiving a respective one of the multiplier bits and the serially read-out multiplicand bits and performing successive partial product operations thereon, a parallel adder having a corresponding number of adding stages for successively adding the sum and carry bit outputs of the multiplying stages, an output shift register for serially receiving the output bits of the parallel adder, and a clock driver which generates the higher frequency internal clock signal from the system clock signal. Specific configurations are provided for CMOS circuits implementing the improved parallel-serial multiplier. The clock driver preferably uses a ring oscillator to derive the higher frequency internal clock signal.

20 Claims, 7 Drawing Sheets

| n4 | n5 | n7 | s | ca | |
|---|---|---|---|---|---|
| 1 | 0 | 0 | 0 | 0 | + (Fig. 1) |
| 0 | 0 | 0 | 1 | 0 | + (Fig. 2) |
| 0 | 1 | 0 | 1 | 0 | |
| 1 | 0 | 1 | 1 | 0 | |
| 1 | 1 | 0 | 0 | 1 | + (Fig. 3) |
| 0 | 1 | 1 | 0 | 1 | |
| 0 | 1 | 1 | 0 | 1 | |
| 1 | 1 | 1 | 1 | 1 | |

FIG. 8

| t | r | p | x | y | ci | s | ca | | A | B | C | D | E | F | G | I | J | K |
|---|---|---|---|---|----|---|----|--|---|---|---|---|---|---|---|---|---|---|
| L | L | L | L | L | L  | V | Z  | | H | L | L | Z | Z | V | V | L | Z | Z |
| L | H | L | L | L | L  | V | L  | | H | L | L | L | L | V | V | L | L | H |
| L | H | L | L | L | L  | L | L  | | H | L | L | L | L | L | H | L | L | H |
| L | L | L | L | L | L  | L | L  | | H | L | L | L | L | L | H | L | L | H |
| H | L | L | L | L | L  | L | L  | | H | L | L | L | L | L | H | L | L | H |
| H | L | L | H | L | L  | L | L  | | H | L | L | L | L | L | H | L | L | H |
| L | L | L | H | L | L  | L | L  | | H | L | L | L | L | L | H | L | L | H |
| H | L | L | H | L | L  | L | L  | | H | L | L | L | L | L | H | L | L | H |
| H | L | L | H | H | L  | L | L  | | L | H | H | L | L | L | H | L | L | H |
| L | L | L | H | H | L  | L | L  | | L | H | H | L | L | L | V | H | L | H |
| L | L | H | H | H | L  | L | L  | | L | H | H | L | L | L | L | H | L | H |
| L | L | L | H | H | H  | L | L  | | L | H | H | L | L | L | L | H | L | H |
| H | L | L | H | H | H  | L | L  | | L | H | H | H | H | L | L | H | H | L |
| L | L | L | H | H | H  | L | H  | | L | H | H | H | H | L | H | H | H | L |
| H | L | L | H | H | H  | L | H  | | L | H | H | H | H | H | H | H | H | H |
| H | L | L | L | H | H  | L | H  | | H | L | L | H | H | H | H | H | H | H |
| L | L | L | L | H | H  | H | H  | | H | L | L | H | H | H | L | L | H | H |
| L | L | L | L | H | L  | H | H  | | H | L | L | H | H | L | L | H | H |   |
| H | L | L | L | H | L  | H | H  | | H | L | L | L | L | H | L | L | L |   |
| H | L | L | L | L | L  | H | H  | | H | L | L | L | L | H | L | L | L |   |
| L | L | L | L | L | L  | H | L  | | H | L | L | L | L | H | V | L | L |   |
| L | L | L | L | L | L  | H | L  | | H | L | L | L | L | H | H | L | L |   |
| L | L | L | L | L | H  | H | L  | | H | L | L | L | L | H | H | L | L |   |
| H | L | L | L | L | H  | H | L  | | H | L | L | L | H | H | H | L | L | H |
| H | L | L | H | L | H  | H | L  | | H | L | L | L | H | H | H | L | L | H |
| L | L | L | H | L | H  | H | L  | | H | L | L | L | H | H | H | L | L | H |
| H | L | H | H | L | H  | H | L  | | H | L | H | L | H | H | H | L | L | H |
| L | L | H | H | L | H  | H | L  | | H | L | H | L | H | H | V | H | L | H |
| L | L | H | H | L | H  | H | L  | | H | L | H | L | H | H | L | H | L | H |
| H | L | L | H | L | H  | H | L  | | H | L | L | H | H | L | L | H | H | L |
| L | L | L | H | L | H  | L | H  | | H | L | L | H | H | L | L | L | H | L |

FIG. 9

|   |   |   |   |   |   |   | x2y2 | x2y1 | x2y0 | x1y2 | x1y1 | x1y0 | x0y2 | x0y1 | x0y0 |   |
|---|---|---|---|---|---|---|------|------|------|------|------|------|------|------|------|---|
|   | xsys |   | $\overline{xsy2}$ | $\overline{xsy1}$ | $\overline{xsy0}$ |   |      |      |      |      |      |      |      |      |      |   |
|   |   |   |   |   |   |   |      |      |      |      |      |      |      |      |      |   |
|   |   |   |   |   |   | $\overline{x2ys}$ | $\overline{x1ys}$ | $\overline{x0ys}$ |   |      |      |      |      |      |      |      |
| 0 | 1 | 1 | 0 | 0 | 0 | 0 | 0 | 0 | 0 | 0 | 0 | 0 | 0 | 0 | 0 | 1 |
|   |   |   |   |   |   |   |   |   |   |   |   |   |   |   |   | 2 |
|   |   |   |   |   |   |   |   |   |   | 1 | 1 | 0 | 0 | 0 | 0 | 3 |
|   |   |   |   |   |   |   |   |   |   |   | 1 | 1 | 0 | 1 | 1 | 4 |
|   |   |   |   |   |   |   |   |   |   |   |   |   |   |   |   | 5 |
|   |   |   |   |   |   |   |   |   |   |   |   |   |   |   | 1 | 6 |
|   |   |   |   |   |   |   |   |   |   |   |   |   | 0 | 0 | 1 | 7 |
|   |   |   |   |   |   |   |   |   |   |   |   |   |   |   | 1 | 8 |

FIG. 10

|   |   |   |   |   |   |   | x0y2 | x0y1 | x1y1 | x1y0 | x0y2 | x0y1 | x0y0 |   |
|---|---|---|---|---|---|---|------|------|------|------|------|------|------|---|
|   |   |   | $\overline{x0ys}$ | x1y2 | x2y1 | x2y0 |   |   |   |   |   |   |   |   |
|   | $\overline{x1ys}$ | x2y2 | $\overline{xsy1}$ | $\overline{xsy0}$ |   |   |   |   |   |   |   |   |   |   |
| $\overline{x2ys}$ | $\overline{xsy2}$ |   |   |   |   |   |   |   |   |   |   |   |   |   |
| xsys |   |   |   |   |   |   |   |   |   |   |   |   |   |   |
| 0 | 0 | 0 | 0 | 0 | 0 | 0 | 0 | 0 | 0 | 0 | 0 | 0 | 0 | 1 |
|   |   |   |   |   |   |   |   |   |   |   |   |   |   | 2 |
|   |   | 1 |   |   |   |   |   |   |   |   |   |   |   | 3 |
|   |   |   | 0 | 1 |   |   |   |   |   |   |   |   |   | 4 |
|   |   |   |   |   |   |   |   |   |   |   |   |   |   | 5 |

FIG. 11

| $\overline{x0ys}$ | $x0y2$ | $x0y1$ | $x0y0$ |
|---|---|---|---|
| $\overline{x1ys}$ | $x1y2$ | $x1y1$ | $x1y0$ |
| $\overline{x2ys}$ | $x2y2$ | $x2y1$ | $x2y0$ |
| $xsys$ | $\overline{xsy2}$ | $\overline{xsy1}$ | $\overline{xsy0}$ |

FIG. 12

| $\overline{x0ys}$ | $x0y7$ | $x0y6$ | $x0y5$ | $x0y4$ | $x0y3$ | $x0y2$ | $x0y1$ | $x0y0$ |
|---|---|---|---|---|---|---|---|---|
| $\overline{x1ys}$ | $x1y7$ | $x1y6$ | $x1y5$ | $x1y4$ | $x1y3$ | $x1y2$ | $x1y1$ | $x1y0$ |
| $\overline{x2ys}$ | $x2y7$ | $x2y6$ | $x2y5$ | $x2y4$ | $x2y3$ | $x2y2$ | $x2y1$ | $x2y0$ |
| $\overline{x3ys}$ | $x3y7$ | $x3y6$ | $x3y5$ | $x3y4$ | $x3y3$ | $x3y2$ | $x3y1$ | $x3y0$ |
| $\overline{x4ys}$ | $x4y7$ | $x4y6$ | $x4y5$ | $x4y4$ | $x4y3$ | $x4y2$ | $x4y1$ | $x4y0$ |
| $\overline{x5ys}$ | $x5y7$ | $x5y6$ | $x5y5$ | $x5y4$ | $x5y3$ | $x5y2$ | $x5y1$ | $x5y0$ |
| $\overline{x6ys}$ | $x6y7$ | $x6y6$ | $x6y5$ | $x6y4$ | $x6y3$ | $x6y2$ | $x6y1$ | $x6y0$ |
| $xsys$ | $\overline{xsy7}$ | $\overline{xsy6}$ | $\overline{xsy5}$ | $\overline{xsy4}$ | $\overline{xsy3}$ | $\overline{xsy2}$ | $\overline{xsy1}$ | $\overline{xsy0}$ |

CMOS PARALLEL-SERIAL MULTIPLICATION CIRCUIT AND MULTIPLYING AND ADDING STAGES THEREOF

FIELD OF INVENTION

The present invention relates to an integrated multiplication circuit, and particularly, to a CMOS parallel-serial multiplication circuit for multiplying binary numbers by the two's complement method.

BACKGROUND OF INVENTION

In conventional integrated multiplication circuits, a two-dimensional M×N array of multiplying stages is used for multiplication of a multiplier of N bits with a multiplicand of M bits. This requires a large number of multiplying stages, which increases geometrically with the number of bits in the multiplier and multiplicand. Moreover, the multiplying stages are operated on a system clock signal, which is inefficient in that the multiplying stages usually can operate at processing speeds faster than the system clock signal.

SUMMARY OF INVENTION

In order to overcome the disadvantages of the conventional devices, it is a principal object of the invention to provide an integrated multiplication circuit which employs a greatly reduced number of multiplying stages. The invention also seeks to operate the multiplying stages at a clock rate comparable to their processing speeds and faster than the system clock signal. A further object is to implement the multiplying stages as CMOS circuits using a reduced number of transistors.

In accordance with the invention, an integrated multiplication circuit is operated in a parallel-serial mode and executes multiplication of a multiplicand of M bits and a multiplier of N bits within the period of a system clock signal by an improved implementation of the two's complement method. The multiplication circuit comprises an input shift register receiving the M bits of the multiplicand in parallel and reading out the M bits serially in accordance with an internal clock signal of higher frequency than the system clock signal, a single chain of multiplying stages each receiving a respective one of the N bits of the multiplier in parallel and the serially read-out bits of the multiplicand successively from the input shift register clocked at the internal clock signal, wherein said multiplying stages output successive, respectively-derived sum and carry bits, a parallel adder having a corresponding number of adding stages for successively adding the sum and carry bit outputs of respective ones of the multiplying stages and outputting respectively-derived sum output bits, an output shift register for receiving and outputting the output bits of the parallel adder, and a clock driver which receives the system clock signal, derives the higher frequency internal clock signal therefrom, and clocks the multiplication circuit in accordance therewith.

The invention also includes specific configurations of CMOS circuits for implementing the improved multiplier in main, intermediate, and initial multiplying stages used in the chain of multiplying stages, and the adding stages for the parallel adder. The clock driver may use a ring oscillator to derive the higher frequency internal clock signal.

BRIEF DESCRIPTION OF DRAWINGS

The above objects and further features and advantages of the invention are described in detail below in conjunction with the drawings, of which.

DETAILED DESCRIPTION OF INVENTION

Figure 4:
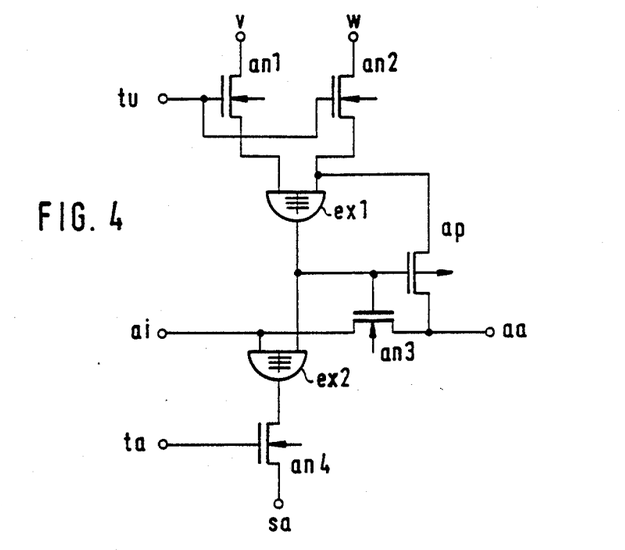
FIG. 4 is a circuit diagram of a CMOS adding stage.
Figure 5:
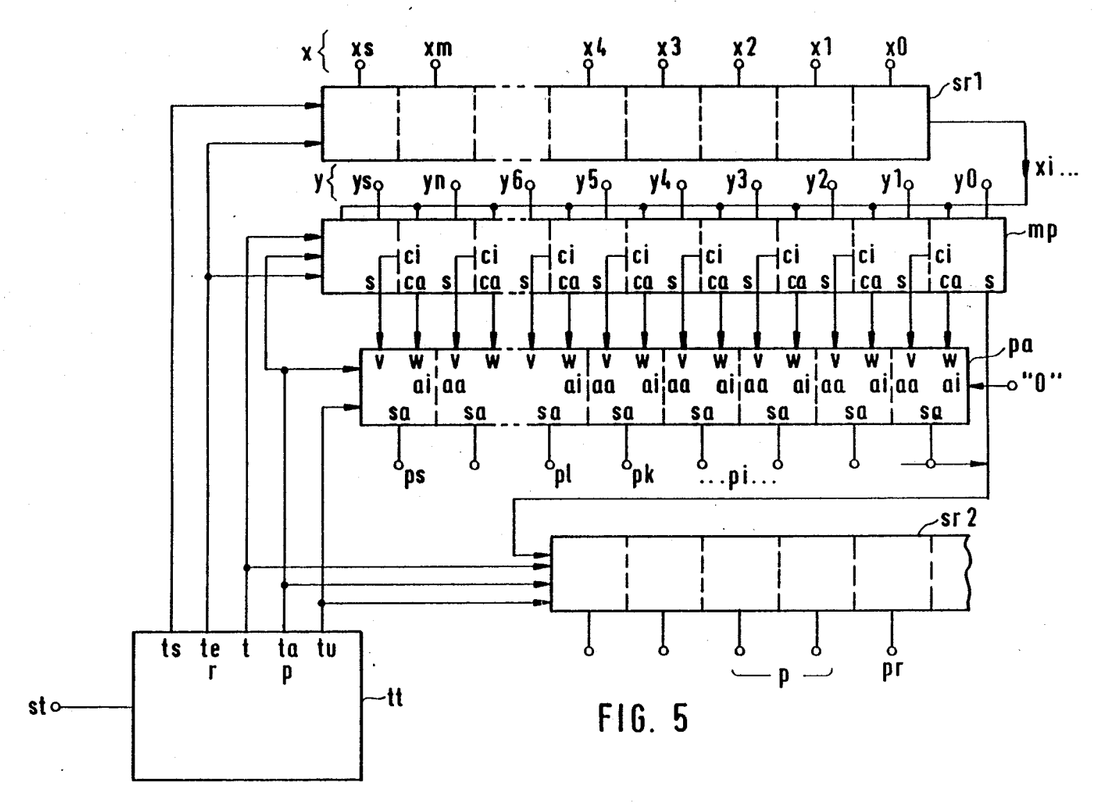
FIG. 5 is a schematic circuit diagram of the CMOS parallel-serial multiplication circuit embodying the invention.

Referring to FIG. 5 for a schematic overview, an integrated multiplication circuit embodying the invention is shown configured in a parallel-serial mode to perform multiplication of a multiplicand of M bits and a multiplier of N bits by the two's complement method. The principle of the two's complement method for multiplication of binary numbers is well known, and is described further below and illustrated in FIGS. 7 to 12 with reference to specific examples. The multiplication circuit includes a first shift register sr1 receiving the multiplicand bits in parallel, a single chain mp of multiplying stages receiving the multiplier bits in parallel and the multiplicand bits successively from the input shift register sr1, a parallel adder pa having a number of adding stages which add the outputs of the multiplying stages, a second shift register sr2 receiving the output bits of the adding stages, and a clock driver tt which receives a system clock signal st and derives the internal clock and control signals for operation of the multiplication circuit. A particular CMOS implementation of the multiplying and adding stages will now be described with reference to FIGS. 1 to 4, before returning to a description of the operation of the multiplication circuit.

Figure 1:
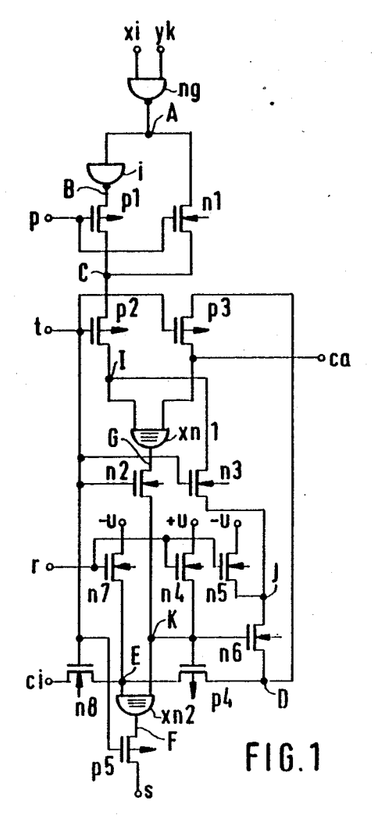
FIG. 1 is a circuit diagram of a main multiplying stage implemented with CMOS circuits in accordance with the invention.

A main multiplying stage is shown in FIG. 1 having a particular configuration of interconnected CMOS circuits. One of the multiplicand bits xi is applied to one input of a NAND gate ng, and one of the multiplier bits yk to the other input. The output of the NAND gate ng is connected to the series combination of an inverter i, the controlled current path of a first P-channel transistor p1, and the controlled current path of a second P-channel transistor p2. The gate of the former transistor is fed with a sign signal p, and that of the latter with an internal clock signal t.

Connected between the output of the NAND gate ng and the junction of the two P-channel transistors p1, p2 is the controlled current path of a first N-channel transistor n1, whose gate is also presented with the sign signal p. The gate of a third P-channel transistor p3 is connected to the gate of the second P-channel transistor p2, so that it is fed with the clock signal t like the gate of the second P-channel transistor p2.

One input of a first EXNOR gate xn1 is connected to the other end of the series combination of inverter i and transistors p1, p2, and its other input is coupled to one end of the controlled current path of the third P-channel transistor p3, which end also provides a carry output ca. Connected to the output of the EXNOR gate xn1 is one end of the controlled current path of a second N-channel transistor n2, while one current-path end of a third N-channel transistor n3 is connected to the other end of the series combination of inverter i and transistors p1, p2 and, thus, to one input of the EXNOR gate xn1.

Inserted between a positive terminal +u of a supply voltage source and the other current-path end of the second N-channel transistor n2 is the controlled current path of a fourth N-channel transistor n4, and the controlled current path of a fifth N-channel transistor n5 is connected between a reference terminal −u of the supply voltage source and the other current-path end of the third N-channel transistor n3. The controlled current path of a sixth N-channel transistor n6 is interposed between the other current-path ends of the fifth N-channel transistor n5 and the third P-channel transistor p3.

Connected to the other current-path end of the sixth N-channel transistor n6 is one current-path end of a fourth P-channel transistor p4. The two gates of these two transistors are connected together and to the junction of the other current-path ends of the second and fourth N-channel transistors n2, n4.

One input of a second EXNOR gate xn2 is connected to the other current-path end of the second N-channel transistor n2 and thus, as mentioned above, to the gates of the fourth P-channel transistor p4 and the sixth N-channel transistor n6 and to the other current-path end of the fourth N-channel transistor n4. Connected between the reference terminal −u and the other input of the second EXNOR gate xn2 is the controlled current path of a seventh N-channel transistor n7, whose gate is fed with a reset signal r, which is also applied to the gates of the fourth and fifth N-channel transistors n4, n5.

The controlled current path of a fifth P-channel transistor p5 is connected between the output of the second EXNOR gate xn2 and an output terminal for the sum output s, and the controlled current path of an eighth N-channel transistor n8 is interposed between the other input of the second EXNOR gate xn2 and an input terminal for the carry signal ci. The gate of the eighth N-channel transistor n8 is fed with the clock signal t, which is also applied to the gates of the second, third, and fifth P-channel transistors p2, p3, p5 and the second, third, and eighth N-channel transistors n2, n3, n8.

Figure 2:
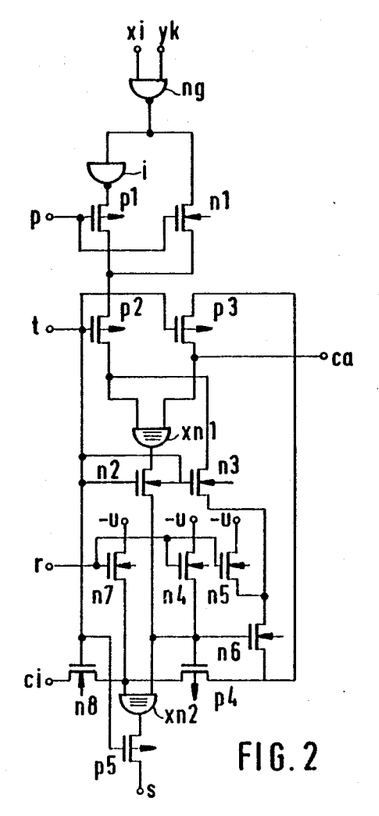
FIG. 2 is a circuit diagram of a CMOS intermediate multiplying stage.

A CMOS intermediate multiplying stage is shown in FIG. 2 having an identical construction to the main multiplying stage of FIG. 1 except that the controlled current path of the fourth N-channel transistor n4 is connected to the reference terminal −u of the supply voltage source, not to the positive terminal +u as in FIG. 1.

Figure 3:
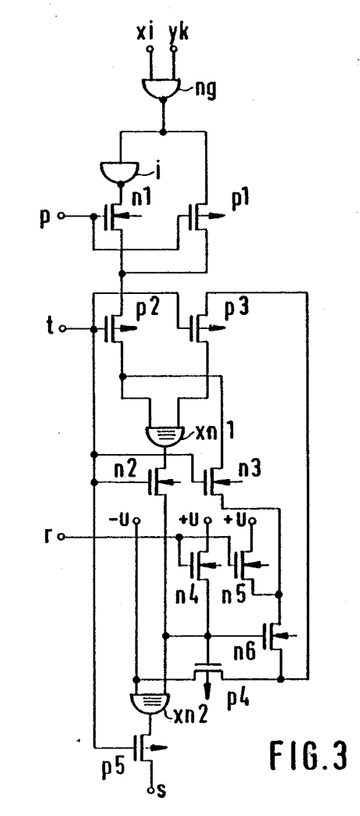
FIG. 3 is a circuit diagram of a CMOS initial multiplying stage.

A CMOS initial multiplying stage is shown in FIG. 3 differing from the main stage of FIG. 1 in a number of features. One main difference is that the initial stage requires no input carry signal ci, thereby eliminating the need for the eighth N-channel transistor n8 of FIG. 1. Since the other input of the second EXNOR gate xn2 can now be connected directly to the reference terminal −u, the seventh N-channel transistor n7 of FIG. 1 is also eliminated. Furthermore, the controlled current path of the fifth N-channel transistor n5 of FIG. 3 is connected to the positive terminal +u of the supply voltage source, not to the reference terminal −u as in FIGS. 1 and 2. Finally, the positions of the first N-channel transistor n1 and the first P-channel transistor p1 are interchanged from those of FIGS. 1 and 2. In the initial stage of FIG. 3, the first P-channel transistor p1 is connected to the output of the NAND gate ng, and the first N-channel transistor n1 to the output of the inverter i.

A CMOS adding stage is shown in FIG. 4 having a first N-channel transistor an1 connected to an input terminal for an augend bit v and to one input of an EXOR gate ex1, while the other input of the EXOR gate ex1 is connected to an input terminal for an addend bit w through the controlled current path of a second N-channel transistor an2. The gates of the two N-channel transistors an1, an2 are fed with an input enable signal tu. An input carry signal ai is applied to one input of a second EXOR gate ex2, whose other input is connected to the output of the first EXOR gate ex1. The controlled current path of a third N-channel transistor an3 is interposed between the one input of the second EXOR gate ex2 and an output terminal for a carry output aa. A P-channel transistor ap is inserted between the other input of the first EXOR gate ex1 and the terminal for the carry output aa and has its gate connected to the output of the first EXOR gate ex1, which is also connected to the gate of the third N-channel transistor an3. Inserted between an output terminal for a sum output sa and the output of the second EXOR gate ex2 is the controlled current path of a fourth N-channel transistor an4, whose gate is presented with an input read signal ta.

The structure and operation of the multiplication circuit of FIG. 5 will now be described with reference to the use of the multiplying and adding stages mentioned above. The M bits, i.e. m+2 bits x0, x1, ... xm, xs, of the multiplicand X, where m represents the substantive bits of the multiplicand, are fed to the parallel inputs of the m+2 stages of the first shift register sr1. Of the m+2 stages, one stage is for the sign bit xs, since the CMOS multiplier is used to process binary two's complement numbers. The sign bit of a negative number is 1, while that of a positive number is 0. The first shift register sr1 is fed with a shift signal ts and an enable signal te provided from the clock driver tt, as further described hereinafter.

Unlike conventional multipliers having a two-dimensional array of multiplying stages, the CMOS multiplier of the invention contains only a single chain mp of n+2 multiplying stages, where n represents the substantive bits of the N bits, i.e. n+2 bits y0, y1, yn, ys, of the multiplier Y. Of the n+2 multiplying stages, one stage is for the sign bit ys.

The inputs of the multiplier bits yk and the multiplicand bits xi are presented for the corresponding binary numbers Y and X during one period of the system clock signal st. Their changes of state occur during the L to H transitions of the system clock signal st. The binary numbers can be either right- or left-justified. By convention, the absolute value of right-justified binary numbers is greater than one, and that of left-justified binary numbers is less than or equal to one. In the latter case, the weight of the most significant bit is $2^{-1}$, and the weights of the next bits to the right decreases by powers of two. A 1-bit as the sign bit of a negative number is interpreted as $-2^0$. Thus, the most negative binary number 10000 ... of the range of numbers described is the decimal number $-1$.

The sign bit is also the bit ahead of the point of the binary fraction represented by the left-justified numbers. For example, the left-justified number 110 is equal to decimal $-2^{-1}$, which is equal to $-0.5$, or the left-justified number 010 is equal to decimal $+2^{-1}$, which is equal to $+0.5$.

If two right-justified binary numbers are to be brought to the same number of bits, the sign bit must be supplemented with bits of the same digit as the sign bit. Thus, if 101 (equal to decimal $-2^1-2^0$, i.e. $-3$) is to be brought to the number of bits of 00101 (equal to decimal $+2^2+2^0$, i.e. ), the binary number 101 becomes 11101. The CMOS multiplier of the invention is suitable for both kinds of numbers.

The chain mp is composed of appropriate ones of the three multiplying-stage variants shown in FIGS. 1 to 3, as follows. The initial multiplying stage shown in FIG. 3 is used for the sign bit ys. If m is less than n, there will be m+1 main multiplying stages, as shown in FIG. 1, and a single intermediate multiplying stage, as shown in FIG. 2, located at a appropriate point behind the initial multiplying stage for the sign bit ys. If m is greater than or equal to n, there will be m+2 main multiplying stages, but no intermediate multiplying stage will be located behind the initial multiplying stage.

All inputs for the multiplicand bits xi of the multiplying stages are connected together to the serial output of the first shift register sr1. The sum output s of each multiplying stage is connected to the carry input c1 of the next less significant stage. This is illustrated schematically in FIG. 5 by a connecting line which runs within a square representing a multiplying stage from the output s, connected outside the square to a stage of the parallel adder pa, to the carry input ci of the adjacent square to the right.

In FIG. 5, the parallel adder pa has n+1 adding stages as shown in FIG. 4. It is fed with an input enable signal tu and a read signal ta from the clock driver tt. In each stage, the carry output aa is connected to the carry input ai of the next more significant stage, as is indicated by the corresponding reference characters written side by side in the adding stages. The carry input ai of the least significant stage is constantly at 0 level.

The multiplying stages of the chain mp and the adding stages of the parallel adder pa are interconnected as follows. The carry output ca of the least significant multiplying stage, i.e. the stage for y0, is coupled to the addend input w of the least significant adding stage, and the sum output s of the second least significant multiplying stage, i.e. the stage for y1, is coupled to the augend input v of the least significant adding stage. The carry output ca of the second least significant multiplying stage, i.e. the stage for y1, is coupled to the addend input w of the second least significant adding stage, and the sum output s of the third least significant multiplying stage, i.e. the stage for y2, is coupled to the augend input v of the second least significant adding stage. This scheme is repeated analogously for the other stages up to the multiplying stage for the sign bit ys and the most significant adding stage, whose output provides the sign bit ps of the product.

The sum output s of the least significant multiplying stage, i.e. the stage y0, is coupled to the serial input of the second shift register sr2 and is combined with the sum outputs of the parallel adder stages to provide the product bits pi of the product P in parallel. The shift register sr2 need not have as many stages as the total length of the product bits, and typically has at most m+3 stages. A product of lesser number of bits may be obtained by omitting the least significant bits not needed to obtain the accuracy required for the further processing of the product. The second shift register sr2 is fed with the internal clock signal t, which serves as a shift signal, the input enable signal tu, and the read signal ta from the clock driver tt.

Figure 6:
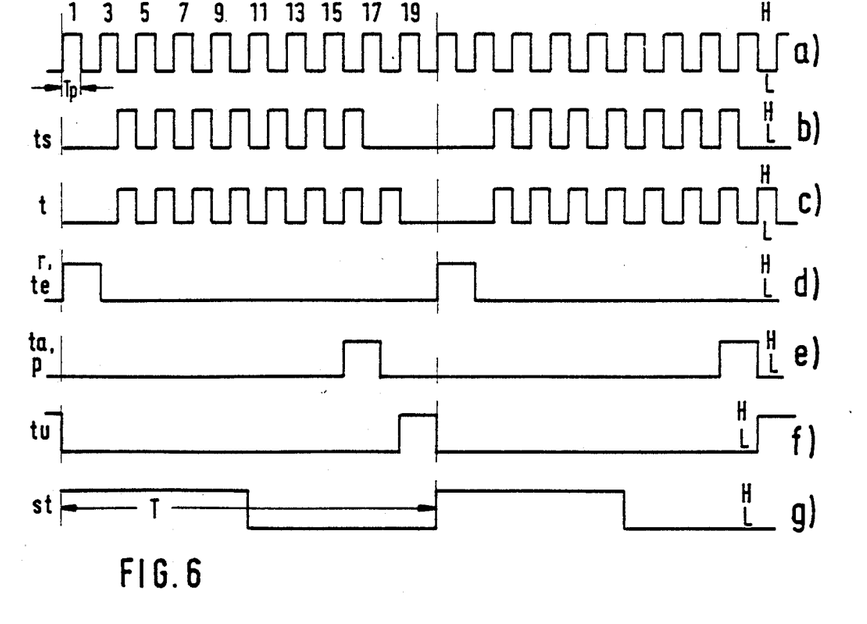
FIG. 6 illustrates the clock and control signals used to operate the multiplication circuit of FIG. 5.

The clock driver tt derives the other clock and control signals from the system clock signal st having a system-clock period T. The waveforms of these signals are shown in FIG. 6 for the case of m=6. In FIG. 6a, the derived clock rate has m+4, i.e. 10, times the frequency of the system-clock period T of FIG. 6g. The derived clock signal is shown dividing the period T into 2(m+4), i.e. 20, subcycles Tp which are a half cycle each and are designated by odd numbers. In FIG. 6b the shift signal ts consists of a burst of m+1 pulses having the duration of one subcycle Tp and a spacing of the same period, beginning at the fourth subcycle. In FIG. 6c, the internal clock signal t consists of a burst of m+2 pulses which begin simultaneously with, and has the same spacing as, the shift signal ts. In FIG. 6d, the write signal te and the reset signal r consists of a pulse occurring during the first two subcycles of the internal clock pulses for each system-clock period. In FIG. 6e, the sign signal p and the read signal ta consist of a pulse occurring during the last subcycle of the burst of the shift signal ts and into the next subcycle. In FIG. 6f, the input enable signal tu consists of a pulse occurring during the last two subcycles. The system clock st is shown in FIG. 6g having the waveform of a square-wave signal with a 1:1 mark-space ratio.

A suitable arrangement for deriving the internal clock signals is a ring oscillator circuit using a series of ring-connected inverter stages which generate higher frequency pulse signals synchronized to the system clock signal, for example, as described in U.S. Pat. No. 4,763,297, issued Aug. 9, 1988, to Uhlenhoff, and U.S. Pat. No. 4,734,597, issued Mar. 29, 1988, to Ullrich and Uhlenhoff. Using such an arrangement for the clock driver applied to the multiplication circuit of FIG. 5, it is readily possible to calculate the products of eight-bit multipliers and up to 16-bit multiplicands applied at a data rate of 20 MHz, with internal clock rates of 200 MHz derived by the ring oscillator for the clocking of the shift registers, multiplication stages, and parallel adder.

From the above-described interconnection of the sum outputs and carry inputs of the multiplying stages and adding stages, an essential property of the invention becomes apparent, namely that in the chain mp, the carry signals propagate from the high order stages to the low order stages, while in the parallel adder pa, the reverse is the case, i.e. the carry signals travel from low-order stages to high-order stages. It is thus appropriate to refer to the high-order stage of the multiplier on the left side of FIG. 5 as the "initial stage".

Another important property of the invention is that the carry signal formed in a multiplying stage, which is transferred via the carry output ca of the stage to the addend input w of the associated adding stage, need not be fed to an adjacent multiplying stage but is processed exclusively within the same multiplying stage.

The operation of the individual stages of the CMOS multiplier will now be described in greater detail. Reference will be made primarily to the main multiplying stage of FIG. 1, and the intermediate multiplying stage of FIG. 2 or the initial multiplying stage of FIG. 3 will be mentioned only where its operation differs from that of the main stage. The description will also refer to the signals shown in FIG. 6, whose levels are indicated as either H (high) or L (low) level, the H level being more positive than the L level. If the L level is the ground potential, i.e. 0 volts, as is usual in CMOS circuits, the H level is a voltage of a few volts. Since the circuit uses positive logic, the H level represents a logical "1", and the L level represents "0".

The first internal clock signal having an H level during the system-clock period T is the reset signal r, whose duration is equal to two subcycles Tp as mentioned above. During the H level of this signal, none of the other signals present at the multiplying stages (except the data signals xi, yk) is at an H level (all signals being at the L level). By the reset signal r, all junction points of the multiplying stage which have a temporary storage behavior are reset to the L level or the H level. These internal junction points include the two inputs of the EXNOR gate xn2, and the junction of the N-channel transistors n3, n5, n6.

The reset action is achieved because, as shown in FIGS. 1 to 3, the transistors controlled by the internal clock signal t, namely the N-channel transistors n2, n3, are arranged "above" the transistors having their gates connected to the reset signal r, namely the transistors n4, n5, n7. This group of transistors, which act as transfer transistors, further include the P-channel transistors p2, p3, p5 and the N-channel transistor n8. The transfer transistors controlled by the reset signal r, the internal clock signal t, or the sign signal p are implemented in a practical circuit as conventional CMOS transmission gates. To simplify the description, however, only the action of the transmission gates responding to the control signal is described for the different conductivity type transistors.

As mentioned above, the internal clock signal t is at an L level during the H level of the reset signal r. Accordingly, the P-channel transistors p2, p3, p5 are on, and the N-channel transistors n2, n3, n8 are off. The N-channel transistors n4, n5, n7 are turned on by the H level of the reset signal r, so that the input of the EXNOR gate xn2 connected to the N-channel transistor n7 is at an L level, while the other input is at an H level applied via the N-channel transistor n4. Consequently, the output of the EXNOR gate xn2 is at an L level, which is transferred through the P-channel transistor p5 to the sum output s.

The H level at the input of the EXNOR gate xn2 connected to the N-channel transistor n4 also turns on the N-channel transistor n6, so that the junction of the P-channel transistors p3, p4 with the N-channel transistor n6 assumes the L level present at the output of the N-channel transistor n5, whereby this junction is effectively discharged. Since the P-channel transistor p3 is on, the carry output ca also assumes the L level. Of the transistors of FIG. 1 controlled by the reset signal r, the N-channel transistors n5, n7 are connected to the reference terminal −u, and the N-channel transistor n4 is connected to the positive terminal +u, so that during the H level of the reset signal, these transistors "feed" the L level into the multiplying stages twice, and the H level once.

The H level fed in by the N-channel transistor n3 must be present at the associated input of the EXNOR gate xn2 during the reset signal r, since an important property or mode of operation of the multiplying stage is that during the n+2 multiplications performed in one system-clock period T, the signals occurring in the stage are not only in their "normal", i.e. noninverted, states but also in their inverted states. The input of the EXNOR gate xn2 connected to the N-channel transistors n2, n4, n6 and to the P-channel transistor p4, however, is an input at which the signals appear in inverted form, so that in the reset condition, this input is at an H level.

Since, in the intermediate stage of FIG. 2, all three N-channel transistors n4, n5, n7 driven by the reset signal r are connected to the reference terminal −u, both inputs of the EXNOR gate xn2 are at an L level during the H level of the reset signal r, which results in an H level at the output of the EXNOR gate xn2, so that the reset signal r causes an H level at the sum output s of the intermediate stage of FIG. 2. The L level transferred by the N-channel transistor n5 cannot be passed on by the N-channel transistor n6, which is cut off by the L level transferred by the N-channel transistor n4. This is done by the P-channel transistor p6, which is turned on by the L level, so that in the intermediate stage also the carry output ca is at an L level.

In the initial stage of FIG. 3, the N-channel transistor n5, in contrast to the stages of FIGS. 1 and 2, transfers an H level to the N-channel transistor n6, which is turned on by the H level transferred by the N-channel transistor n4 and thus transfers the H level to one input of the EXNOR gate xn1. In the stages of FIGS. 1 and 2, this input is connected to the carry output ca. However, the initial stage has no carry output to the parallel adder pa, as shown in FIG. 5. The carry signal is processed within the initial stage, as in the stages of FIGS. 1 and 2.

The input for the multiplying stages is presented with the respective multiplier bits yk, e.g. the bit y4, during one period of the system clock st. The multiplicand bits xi are applied successively to the interconnected multiplicand-bit inputs of the multiplying stages on the pulses of the higher-frequency internal clock signal t during the period T of the system clock st. At the output of the NAND gate ng, the multiplication signal is thus present in inverted form. During the H level of the reset signal r, the least significant bit x0 of the multiplicand is applied to the multiplying stages, since the reset signal r is concurrent with the read signal te of the shift register sr1 and since the corresponding bit output of the adder is the same as the output of the stage for the least significant bit.

As the polarity signal p is at an L level during the H level of the reset signal r, the xy multiplication signal formed by the NAND gate ng, which appears at the output of the latter in inverted form, passes as a noninverted signal (because of the inverter i) through the conducting P-channel transistor p1 to the current path of the P-channel transistor p2. Conversely, in the initial stage of FIG. 3, the inverted xy multiplication signal passes through the P-channel transistor p1, which is turned on by the L level of the polarity signal p, to the current path of the P-channel transistor p2, since the positions of the N-channel transistor n1 and P-channel transistor p2 in FIG. 3 are interchanged from those of FIGS. 1 and 2. In the main and intermediate stages of FIGS. 1 and 2, the xy multiplication signal is transferred in inverted form to the current path of the P-channel transistor p2 only if the polarity signal p is at an H level during the subcycles 16 and 17 of FIG. 6, i.e. during the last subcycle of the burst of the shift clock signal ts and the subsequent subcycle. In the initial stage of FIG. 3, the xy multiplication signal is transferred during this H level in noninverted form because the N-channel transistor n1 is then conducting.

As is known conventionally, a multiplying stage has a logic AND portion, which performs the xy multiplication, and a subsequent adder portion. In the embodiment of the invention, the xy multiplication signal appears at the current path of the P-channel transistor p2 and, hence, at one of the three inputs of the adder portion of the multiplying stage in inverted or noninverted form. The second input to the adder portion is the carry input ci, which is connected to the sum output of the next more significant stage of the chain mp. The third input to the adder portion is the input for the stage's own carry output, namely the input of the EXNOR gate xn1 connected to the current path of the P-channel transistor p3.

The signal passage through the adder portion of the multiplying stage is divided into two parts. This division is caused by a pulse duration of subcycle Tp of the internal clock signal t followed by a pulse interval of the same length. During the H level of the internal clock signal t, the N-channel transistors n2 to n8 are on, while during the L level, the P-channel transistors p2 to p5 are on. This successive switching of the N- and P-channel transistors into the conducting state coacts with the above-mentioned storage behavior of the junction points referred to previously. Thus, the output signal from the EXNOR gate xn1 and the carry signal ci are transferred to the two inputs of the EXNOR gate xn2 during the H level of the internal clock signal t. The EXNOR gate xn2 can form its output signal during the subcycle Tp, because its output signal is transferred to the sum output s only during the L level of the internal clock signal t. If the output of the EXNOR gate xn1 is an L level, which is transferred to the gate of the P-channel transistor p4 during the H level of the internal clock signal t, this transistor will be turned on and the signal at the carry input ci will be transferred to the current path of the P-channel transistor p3. This signal level and the signal level at the current path of the P-channel transistor p2 are each transferred to one of the inputs of the EXNOR gate xn1 during the L level of the internal clock signal t.

Figure 7:
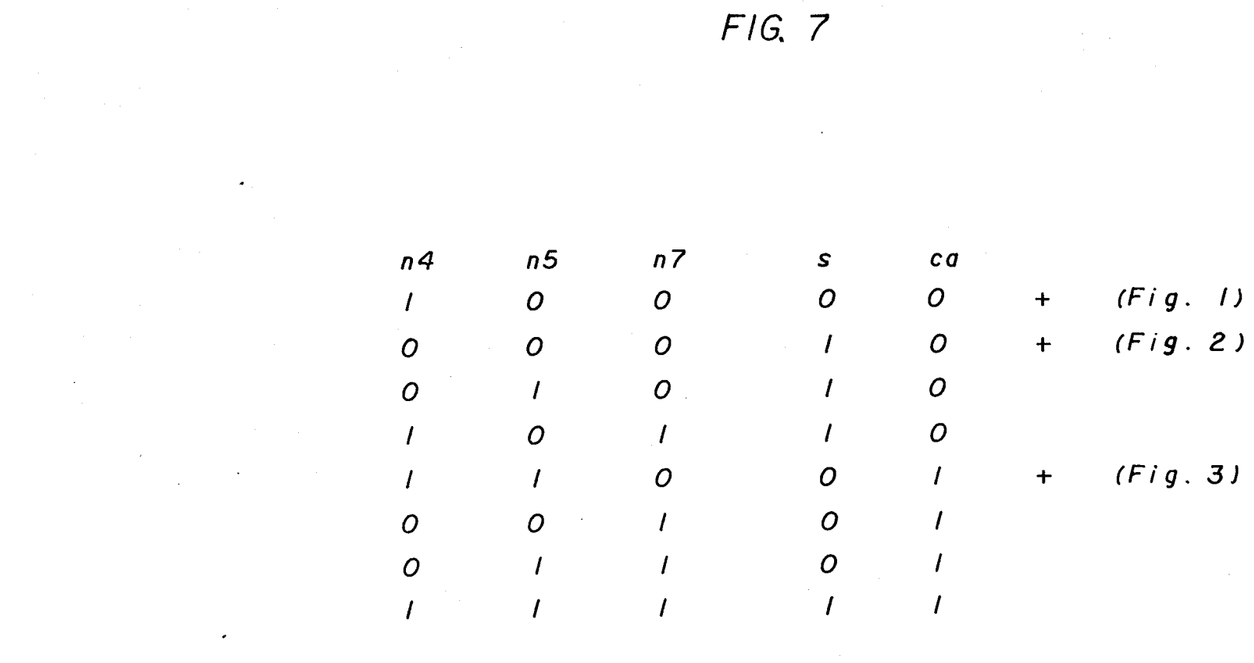
FIGS. 7 to 12 show multiplication tables illustrating the operation of the multiplication circuit of FIG. 5 to perform multiplication by the binary number two's complement method.

If the three variants of the CMOS multiplying stage according to the invention are viewed without the potentials applied to the N-channel transistors n4, n5, n7, the current-path ends no longer connected to these potentials are three reset inputs through which input signals can be fed into the stage. As a result, at least one additional input can be added by means of the described stage without the need for an additional adding stage. The possible reset combinations are illustrated in the table of FIG. 7, in which the cases marked with a plus sign on the right are those corresponding to the stages described with reference to FIGS. 1 to 3. The table illustrates the results of the signals applied to the current paths of the transistors n4, n5, n7 and the signals appearing at the outputs s, ca. A "1" indicates an H level signal, and a "0" an L level signal. As shown in FIG. 7, the states 10 and 01 at the outputs s, ca used in the invention (marked with the plus sign) also occur in two other reset-signal combinations, which may also be used if required.

Figure 8:
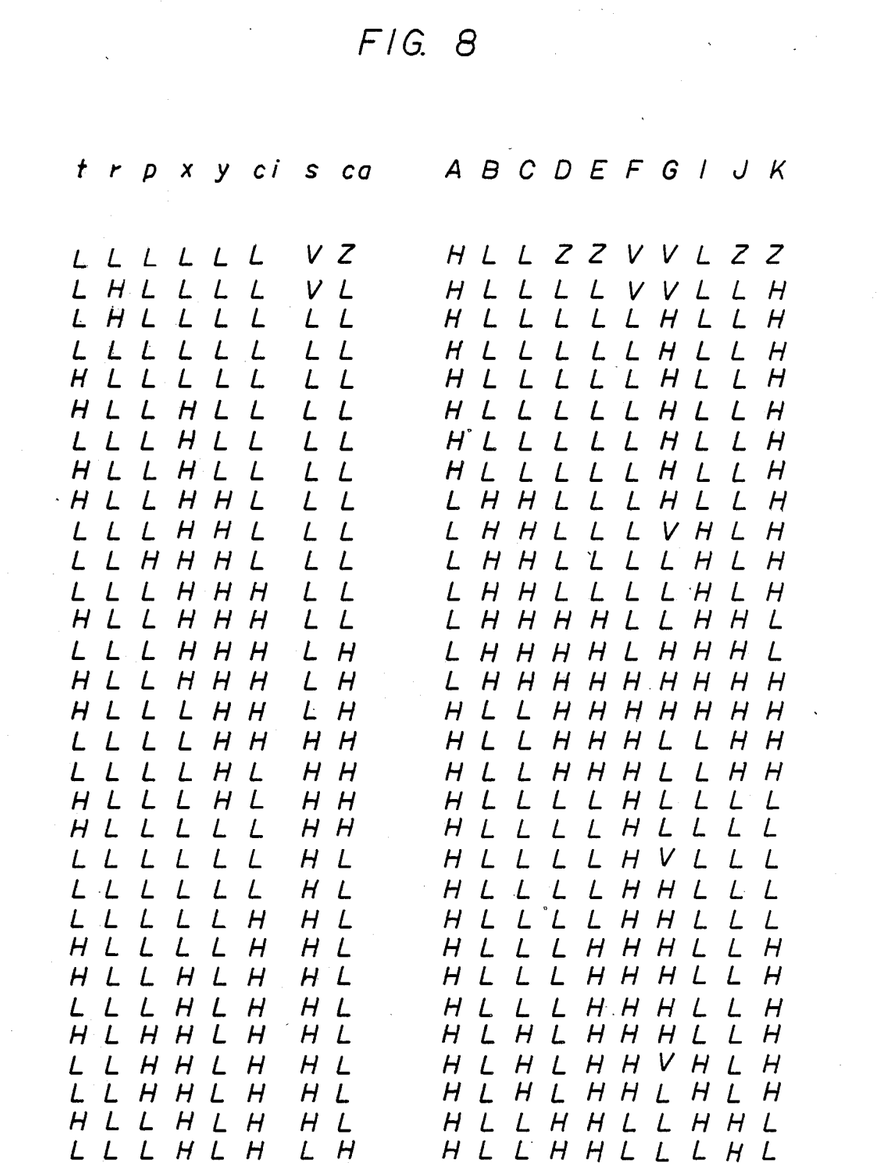

In FIG. 8, the possible combinations of signals input, output, and present at nodes A to K of the main multiplying stage of FIG. 1 are listed in table form. A "V" indicates that the potential at the node is in transition, i.e. has not yet reached the H or L level. A "Z" indicates that the potential is unknown at that instant. Each row in FIG. 8 shows the results for at least one different state of an input signal.

Figure 9:
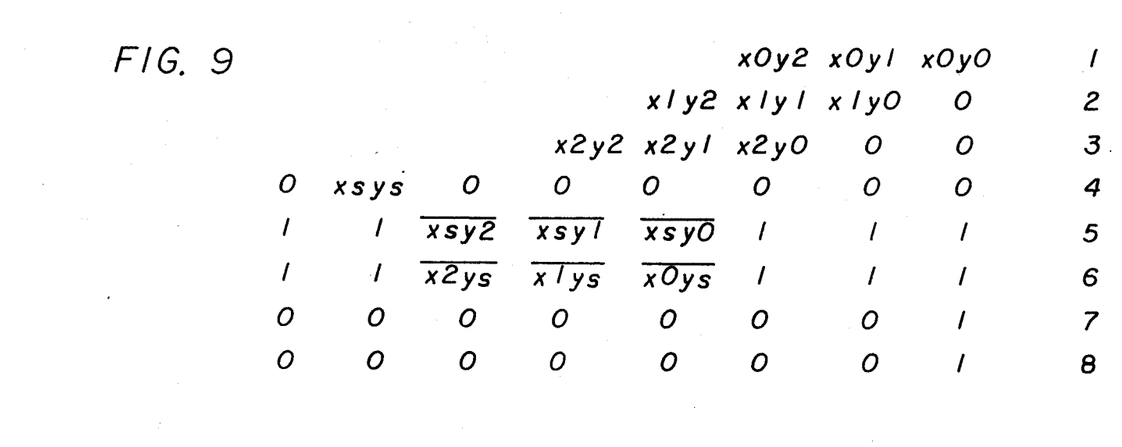
Figure 10:
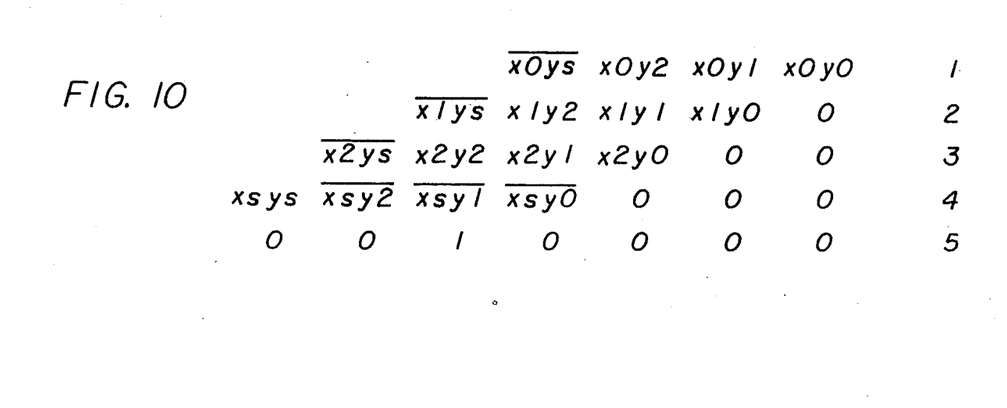

To further explain the multiplication circuit of the invention and its operation, the multiplication principle on which the invention is based will now be described in greater detail. The principle of the invention is an improvement on the two's complement binary number multiplication method described in "IEEE Transactions in Computers", 1973, pages 1045 to 1047. FIG. 9 illustrates the multiplication of two binary numbers, for example, xs, x2, x1, x0 and ys, y2, y1, y0. (The numbers in the extreme right hand column are the row numbers for the table.) The xy products in rows 1 to 6 are the partial products of the individual bits of each of the two binary numbers formed in the corresponding multiplying stages. The result of a partial product is fed vertically downward into the multiplying stage of the next row, and the carry signal of the partial product is fed toward the lower left into the stage adjacent the stage receiving the sum signal.

The partial products which contain bits with twos significances, i.e. the partial products of bits x0, x1, x2 and y0, y1, y2, are formed in rows 1 to 3. In row 4, the partial product of the sign bits xs, ys is formed. The zeros in the individual positions of rows 1 to 4 indicate that the multiplying stages there receive no xy input signals but only the above-mentioned sum and/or carry signals. The rows 5 to 8 are necessary for multiplication of the two's complement numbers. In rows 5 and 6, the input signals are inverted, and the 1s are used as the inverted form of the 0s. The inverted partial products are those which form the sign bits xs, ys of one binary number with the remaining bits y0, y1, y2 and x0, x1, x2 of the other binary number. Since a 1 must be added to the result of the inversion to obtain the two's complement, rows 7 and 8 each have a 1 in the least significant position.

The scheme of FIG. 9 becomes much simpler if for a predetermined number of bits, the multiplication of the two largest negative numbers, the multiplication of 1000 times 1000, for example, is excluded, because no stages are then necessary for the carry signal of the sign bits, i.e. the extreme left column of FIG. 9 can be omitted. The scheme of FIG. 9 can thus be modified to that of the table shown in FIG. 10 (in which the rows are again numbered on the extreme right). As with that of FIG. 9, the sum is transferred vertically downward, and the carry toward the lower left. As compared to FIG. 9, a modification is made under the commutative law for additions by changing the order of partial products in a column of the table. The 1s in rows 5 to 8 of FIG. 9 are combined by performing their addition: the two 1s below xsys in rows 5 and 6 of FIG. 9 give 0, so that two 0s are written in place of the 1s, and the 1 of the carry is suppressed because in FIG. 10 the extreme left column of FIG. 9 is omitted; the two extreme right 1s in rows 7 and 8 of FIG. 9 give two 0s in place of the 1s, and a 1 in row 7 and in the next column to the left; since row 8 thus contains only 0s, it is also omitted; the two rightmost 1s in rows 5 and 6 give a carry 1 in the next column to the left, etc.; the result of this addition of 1s is the 1 in row 5, column 4, of FIG. 10.

Figure 11:
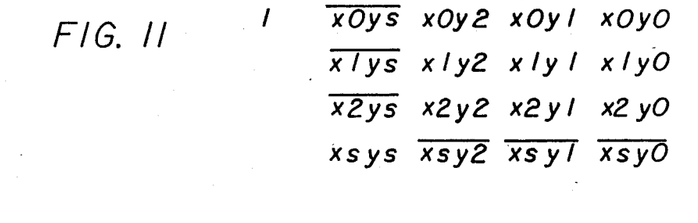

By changing the direction of transfer of the sum result from vertically downwards toward the lower right, and of the carry result from toward the lower left to vertically downwards, the improved scheme of the table of FIG. 11 is obtained. The 1 on the extreme upper left is obtained by applying the commutative law to the third column from the left of FIG. 10.

The foregoing explanation of the multiplier principle underlying the invention relates to the product of two binary numbers having the same number of bits, and in which a single 1 must be added on the upper left row and column position. In the case of products of two binary numbers with different numbers of bits, p+1 1s must be added in the first row, where p is the difference between the number of bits of the two binary numbers. The table of FIG. 12 illustrates the multiplication table for an eight-bit multiplicand X and a nine-bit multiplicand Y (the sign bit being included in both bit-counts), using the improved multiplier scheme of the invention as was used in FIG. 11.

Figure 12:
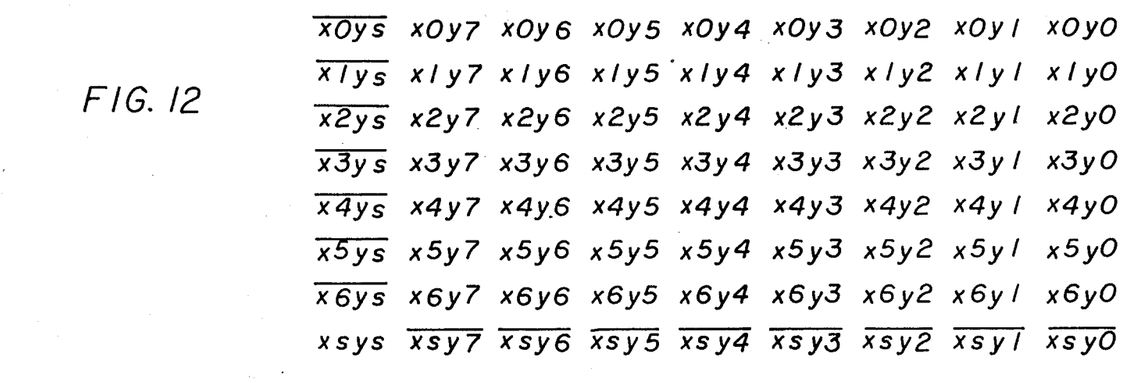

In the multiplication circuit of the invention embodying the improved multiplier scheme, the plural rows of FIGS. 11 and 12, equal to the number of bits of the multiplicand X, is collapsed into one row by the parallel-serial mode of operation, as illustrated by the following:

xmys, xmy7, xmy6, xmy5, xmy4, xmy3, xmy2, xmy1
where "m" symbolizes the index of the
multiplicand X, which changes serially at the pulse
rate of the internal clock signal t in the serial
processing of the multiplying stages.

The specific embodiments of the invention described herein are intended to be illustrative only, and many other variations and modifications may be made thereto in accordance with the principles of the invention. All such embodiments and variations and modifications thereof are considered to be within the scope of the invention, as defined in the following claims.

I claim:

1. An integrated multiplication circuit, for binary multiplication of a multiplicand of M bits and a multiplier of N bits where M and N are a positive integer, comprising:
   an input shift register receiving the M bits of the multiplicand in parallel and reading out the M bits serially when clocked by an internal clock signal;
   a single chain having a plurality of multiplying stages, wherein each multiplying stage receives a respective one of the N bits of the multiplier at one input and each of the M bits of the multiplicand in succession at another input, and performs partial product multiplications successively between said respective one bit of the multiplier and each of the M bits of the multiplicand when they are serially read-out from said input shift register so as to output respectively-derived sum and carry bit outputs;
   a parallel adder having a plurality of adding stages corresponding to respective ones of said plurality of multiplying stages, wherein each adding stage receives in parallel the sum bit output of one of said multiplying stages at one input and the carry bit output of a next adjacent one of said multiplying stages at an other input, and adds the received inputs successively and outputs a respective sum bit output;
   an output shift register for serially receiving the sum bit outputs from said parallel adder when clocked by said internal clock signal; and
   a clock driver for providing said internal clock signal for clocking the operation of said multiplication circuit in accordance therewith.

2. An integrated multiplication circuit according to claim 1, wherein said multiplying stages include respective carry bit inputs, and the sum bit output of a multiplying stage is connected to a carry bit input of the next less significant stage, and the carry bit inputs propagate along said chain of multiplying stages from the more significant stages to the less significant stages.

3. An integrated multiplication circuit according to claim 1, wherein said adding stages include respective carry bit inputs and carrying bit outputs, and a carry bit output of an adding stage is connected to a carry bit input of the next more significant stage, and the carry bit inputs propagate along said adding stages from the less significant stages to the more significant stages.

4. An integrated multiplication circuit according to claim 3, wherein the internal clock frequency is M+2 times the system clock frequency.

5. An integrated multiplication circuit according to claim 4, wherein the multiplicand is an 8-bit number, said system clock frequency is 20 MHz, and the internal clock frequency is 200 MHz.

6. An integrated multiplication circuit according to claim 1, wherein the multiplicand and the multiplier bits are applied to said input shift register and said chain of multiplier stages, respectively, during a period of a system clock signal of a system-clock frequency, and said clock driver receives the system clock signal and generates said internal clock signal of a higher frequency than the system-clock frequency in order to clock the successive partial product and adding operations of said multiplication circuit within the period of the system clock signal.

7. An integrated multiplication circuit according to claim 6, wherein said clock driver further generates a reset signal, and each multiplication stage include a reset input for receiving the reset signal and resetting said stage.

8. An integrated multiplication circuit according to claim 4, wherein said clock driver includes a ring oscillator for generating the internal clock signal in synchronism with the system clock signal.

9. An integrated multiplication circuit according to claim 1, wherein the multiplier number includes a sign bit at one end of its number bits, and said multiplication stages are composed of an initial multiplication stage at the position of the sign bit and main multiplication stages at the positions of the other multiplier bits.

10. An integrated multiplication circuit according to claim 9, wherein the multiplicand number includes a sign bit at one end of its number bits, and the multiplicand bit number M is less than the multiplier bit number N, and said multiplication stages are composed of an initial multiplication stage at the position of the multiplier sign bit, an intermediate multiplication stage following said initial multiplication stage, and main multiplication stages at the positions of the other multiplier bits.

11. An integrated multiplication circuit according to claim 1, wherein each multiplication stage includes means for feeding back its own carry bit output from one partial product operation for processing within the same said stage in the next partial product operation.

12. An integrated multiplication circuit according to claim 1, wherein said multiplying and adding stages are formed of CMOS circuits.

13. A method of performing binary multiplication of a multiplicand of M bits and a multiplier of N bits where M and N are a positive integer in an integrated multiplication circuit, comprising the steps of:

reading the M bits of the multiplicand in parallel to an input shift register and readnig out the M bits serially when clocked by an internal clock signal;

performing partial product multiplications between the multiplier bits and the multiplicand bits in a single chain of multiplying stages, wherein each multiplying stage receives a respective one of the N bits of the multiplier at one input and each of the M bits of the multiplicand in succession at another input when they are serially read-out from said input shift register, and outputs respective sum and carry bit outputs;

adding the sum and carry bit outputs from said chain of multiplying stages in a parallel adder having a plurality of adding stages in parallel which output respectively-derived sum bit outputs; and serially receiving the sum bit outputs from said parallel adder in an output shift register when clocked by said internal clock signal.

14. A multiplication method according to claim 13, wherein said multiplying stages include respective carry bit inputs, and the sum bit output of a multiplying stage is connected to a carry bit output of the next less significant stage, and the said partial product multiplication step is performed by propagating the carry bit inputs along said chain of multiplying stages from the more significant stages to the less significant stages.

15. A multiplication method according to claim 13, wherein said adding stages include respective carry bit inputs and carry bit outputs, and a carry bit output of an adding stage is connected to a carry bit input of the next more significant stage, and the adding step is performed by propagating carry bit inputs along said adding stages from the less significant stages to the more significant stages.

16. A multiplication method according to claim 13, wherein the multiplicand and the multiplier bits are applied to said input register and said chain of multiplier stages, respectively, during a period of a system clock signal of a system-clock frequency, and said method further comprises the step of generating said internal clock signal of a higher frequency than the system-clock frequency in order to clock the successive partial product and adding operations of said multiplication method within the period of the system clock signal.

17. A CMOS multiplying stage, for performing a multiplication operation on an input multiplicand bit and an input multiplier bit, comprising:

a NAND gate receiving the multiplicand bit at one input and the multiplier bit at its other input, and providing an output;

a first P-channel transistor and a first N-channel transistor in parallel each having one end of their controlled current paths connected in series to the output of said NAND gate;

a second P-channel transistor having one end of its controlled current path connected to the other ends of the controlled current paths of said first P-channel and said first N-channel transistors, and having its gate connected to an input for a clock signal;

a third P-channel transistor including one and an other end of its controlled current path, and having its gate connected in common to the gate of said second P-channel transistor;

a first EXNOR gate having one input connected to the other end of the controlled current path of said second P-channel transistor and its other input connected to the other end of the controlled current path of said third P-channel transistor;

a second N-channel transistor having one end of its controlled current path connected to the output of said first EXNOR gate, and its gate connected in common to the gate of said second P-channel transistor;

a third N-channel transistor having one end of its controlled current path connected to the other end of the controlled current path of said second P-channel transistor, and its gate connected in common to the gate of said second P-channel transistor;

a fourth N-channel transistor including one and an other end of a controlled current path, and having its gate connected to an input for a reset signal;

a fifth N-channel transistor including one and an other end of a controlled current path, and having its gate connected to the input for the reset signal;

a sixth N-channel transistor having one end of its controlled current path connected to the other ends of the controlled current paths of said third and said fifth N-channel transistors, and its gate connected to the other ends of the controlled current paths of said second and said fourth N-channel transistors;

a fourth P-channel transistor including one and an other end of its controlled current path, wherein the other end of the controlled current path is connected to the other end of the controlled current path of said sixth N-channel transistor and to the one end of the controlled current path of said third P-channel transistor, and having its gate connected to the other ends of the controlled current paths of said second and said fourth N-channel transistors;

a second EXNOR gate having one input connected to the one end of the controlled current path of said fourth P-channel transistor and its other input connected to the other ends of the controlled current paths of said second and said fourth N-channel transistors; and a fifth P-channel transistor having one end of its controlled current path connected to the output of said second EXNOR gate, the other end of its controlled current path providing a sum bit output, and its gate connected in common to the gate of said second P-channel transistor.

18. A CMOS multiplying stage according to claim 17 and constituted as a main multiplying stage, wherein said first P-channel transistor has the one end of its controlled current path connected through an inverter to the output of said first EXNOR gate, said first P-channel and said first N-channel transistors have their gates connected to an input for a multiplication number polarity signal, said other end of the controlled current path of said third P-channel transistor provides a carry bit output, said one end of the controlled current path of said fourth N-channel transistor is connected to a positive voltage terminal, and said one end of the controlled current path of said fifth N-channel transistor is connected to a reference voltage terminal, and further comprising:

a seventh N-channel transistor having one end of its controlled current path connected to the reference voltage terminal, the other end of its controlled current path connected to the one input of said second EXNOR gate, and its gate connected in common to the input for the reset signal; and an eighth N-channel transistor having one end of its controlled current path connected to an input for a carry bit input, the other end of its controlled current path connected to the one input of said second EXNOR gate, and its gate connected in common to the gate of said second P-channel transistor.

19. A CMOS multiplying stage according to claim 17 and constituted as an intermediate multiplying stage, wherein said first P-channel transistor has the one end of its controlled current path connected through an inverter to the output of said first EXNOR gate, said first P-channel and said first N-channel transistors have their gates connected to an input for a multiplication number polarity signal, said other end of the controlled current path of said third P-channel transistor provides a carry bit output, said one end of the controlled current path of said fourth N-channel transistor is connected to a reference voltage terminal, and said one end of the controlled current path of said fifth N-channel transistor is connected to the reference voltage terminal, and further comprising:

a seventh N-channel transistor having one end of its controlled current path connected to the reference voltage terminal, the other end of its controlled current path connected to the one input of said second EXNOR gate, and its gate connected in common to the input for the reset signal; and an eighth N-channel transistor having one end of its controlled current path connected to an input for a carry bit input, the other end of its controlled current path connected to the one input of said second EXNOR gate, and its gate connected in common to the gate of said second P-channel transistor.

20. A CMOS multiplying stage according to claim 17 and constituted as an initial multiplying stage, wherein said first N-channel transistor has the one end of its controlled current path connected through an inverter to the output of said first EXNOR gate, said first P-channel and said first N-channel transistors have their gates connected to an input for a multiplication number polarity signal, said one end of the controlled current path of said fourth N-channel transistor is connected to a supply voltage terminal, said one end of the controlled current path of said fifth N-channel transistor is connected to the positive voltage terminal, and the one input to said second EXNOR gate is connected to a reference voltage terminal.

* * * * *